United States Patent
Miller et al.

(10) Patent No.: US 9,452,735 B2
(45) Date of Patent: Sep. 27, 2016

(54) SYSTEM AND METHOD FOR CONTROLLING A RESTRICTED MODE IN A VEHICLE

(75) Inventors: Thomas Lee Miller, Ann Arbor, MI (US); Brian Bennie, Sterling Heights, MI (US); Eric L. Reed, Livonia, MI (US); Lisa Therese Boran, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1632 days.

(21) Appl. No.: 13/024,460

(22) Filed: Feb. 10, 2011

(65) Prior Publication Data

US 2012/0209454 A1 Aug. 16, 2012

(51) Int. Cl.
*G06F 19/00* (2011.01)
*B60R 25/20* (2013.01)
*B60W 50/12* (2012.01)

(52) U.S. Cl.
CPC ............ *B60R 25/20* (2013.01); *B60W 50/12* (2013.01); *B60W 2530/18* (2013.01); *B60W 2540/28* (2013.01); *B60W 2720/10* (2013.01)

(58) Field of Classification Search
CPC .......... B60W 2530/18; B60W 50/12; B60W 2540/28; B60W 2720/10; B60B 25/20; B60R 25/20
USPC ............................................................ 701/2
See application file for complete search history.

(56) References Cited

U.S. PATENT DOCUMENTS

| 4,543,569 A | 9/1985 | Karlstrom |
| 5,081,667 A | 1/1992 | Drori et al. |
| 5,467,070 A | 11/1995 | Drori et al. |
| 5,513,107 A | 4/1996 | Gormley |
| 5,627,510 A | 5/1997 | Yuan |
| 5,635,916 A | 6/1997 | Bucholtz et al. |

(Continued)

FOREIGN PATENT DOCUMENTS

| CN | 1863052 | 11/2006 |
| CN | 101082949 A | 12/2007 |

(Continued)

OTHER PUBLICATIONS

Autobiometrics, Com, US Distributor for ATRD Biometric Immobilizer, http://www.autobiometrics.com, Jul. 6, 2011.

(Continued)

*Primary Examiner* — Stefanos Karmis
*Assistant Examiner* — Michael E Butler
(74) *Attorney, Agent, or Firm* — Brooks Kushman P.C.; Jennifer M. Stec

(57) ABSTRACT

A device for controlling a restricted mode of a vehicle is provided. The device includes a controller that is configured to receive an input indicative of a request to change a vehicle state from a fully operational mode to a restricted mode and to transmit a first control signal indicative of a request to limit at least one of vehicle speed and vehicle acceleration. The controller is further configured to monitor a distance traveled by a driver when the vehicle is in the restricted mode and to compare the distance traveled to a predetermined distance limit. The controller is further configured to transmit a second control signal to remove the request to limit the at least one of the vehicle speed and the vehicle acceleration in response to determining that the distance traveled exceeds the predetermined distance limit.

8 Claims, 5 Drawing Sheets

(56) References Cited

U.S. PATENT DOCUMENTS

| | | |
|---|---|---|
| 5,655,081 A | 8/1997 | Bonnell et al. |
| 5,734,336 A | 3/1998 | Smithline |
| 5,776,031 A | 7/1998 | Minowa et al. |
| 5,828,319 A | 10/1998 | Tonkin et al. |
| 5,874,889 A | 2/1999 | Higdon et al. |
| 5,959,540 A | 9/1999 | Walter |
| 6,018,291 A | 1/2000 | Marble et al. |
| 6,133,825 A | 10/2000 | Matsuoka |
| 6,177,866 B1 | 1/2001 | O'Connell |
| 6,198,996 B1 | 3/2001 | Berstis |
| 6,263,282 B1 | 7/2001 | Vallancourt |
| 6,268,804 B1 | 7/2001 | Janky et al. |
| 6,271,745 B1 | 8/2001 | Anzai et al. |
| 6,282,226 B1 | 8/2001 | Furukawa |
| 6,430,488 B1* | 8/2002 | Goldman et al. ............... 701/36 |
| 6,434,455 B1 | 8/2002 | Snow et al. |
| 6,434,486 B1 | 8/2002 | Studt et al. |
| 6,438,491 B1 | 8/2002 | Farmer |
| 6,539,078 B1 | 3/2003 | Hunt et al. |
| 6,574,734 B1 | 6/2003 | Colson et al. |
| 6,590,495 B1 | 7/2003 | Behbehani |
| 6,668,221 B2 | 12/2003 | Harter, Jr. et al. |
| 6,679,702 B1 | 1/2004 | Rau |
| 6,690,260 B1 | 2/2004 | Ashihara |
| 6,737,963 B2 | 5/2004 | Gutta et al. |
| 6,754,562 B2 | 6/2004 | Strege et al. |
| 6,785,542 B1 | 8/2004 | Blight et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 6,941,194 B1 | 9/2005 | Dauner et al. |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 | 12/2006 | Aoyama et al. |
| 7,161,563 B2 | 1/2007 | Vitale et al. |
| 7,173,903 B2 | 2/2007 | Remboski et al. |
| 7,194,069 B1 | 3/2007 | Jones et al. |
| 7,207,041 B2 | 4/2007 | Elson et al. |
| 7,228,213 B2 | 6/2007 | Sakai et al. |
| 7,246,062 B2 | 7/2007 | Knott et al. |
| 7,266,438 B2 | 9/2007 | Kellum et al. |
| 7,337,113 B2 | 2/2008 | Nakagawa et al. |
| 7,340,332 B2 | 3/2008 | Underdahl et al. |
| 7,356,394 B2 | 4/2008 | Burgess |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,484,008 B1 | 1/2009 | Gelvin et al. |
| 7,565,230 B2 | 7/2009 | Gardner et al. |
| 7,602,782 B2 | 10/2009 | Doviak et al. |
| 7,783,475 B2 | 8/2010 | Neuberger et al. |
| 7,812,712 B2 | 10/2010 | White et al. |
| 7,826,945 B2 | 11/2010 | Zhang et al. |
| 8,050,817 B2 | 11/2011 | Moinzadeh et al. |
| 8,050,863 B2 | 11/2011 | Trepagnier et al. |
| 8,089,339 B2 | 1/2012 | Mikan et al. |
| 8,232,864 B2 | 7/2012 | Kakiwaki |
| 8,237,554 B2 | 8/2012 | Miller et al. |
| 8,258,939 B2 | 9/2012 | Miller et al. |
| 8,301,108 B2 | 10/2012 | Naboulsi |
| 8,305,189 B2 | 11/2012 | Miller et al. |
| 8,311,722 B2 | 11/2012 | Zhang et al. |
| 2001/0021891 A1 | 9/2001 | Kusafuka et al. |
| 2001/0041955 A1* | 11/2001 | Nada ..................... B60K 6/445 701/29.2 |
| 2002/0013650 A1 | 1/2002 | Kusafuka et al. |
| 2002/0031228 A1 | 3/2002 | Karkas et al. |
| 2002/0096572 A1 | 7/2002 | Chene et al. |
| 2002/0097145 A1 | 7/2002 | Tumey et al. |
| 2003/0004730 A1 | 1/2003 | Yuschik |
| 2003/0055643 A1 | 3/2003 | Woestemeyer et al. |
| 2003/0079123 A1 | 4/2003 | Mas Ribes |
| 2003/0217148 A1 | 11/2003 | Mullen et al. |
| 2003/0220725 A1 | 11/2003 | Harter, Jr. et al. |
| 2003/0231550 A1 | 12/2003 | Macfarlane |
| 2004/0046452 A1 | 3/2004 | Suyama et al. |
| 2004/0049324 A1* | 3/2004 | Walker .............................. 701/1 |
| 2004/0073367 A1 | 4/2004 | Altan et al. |
| 2004/0088205 A1 | 5/2004 | Geisler et al. |
| 2004/0124968 A1 | 7/2004 | Inada et al. |
| 2004/0176906 A1 | 9/2004 | Matsubara et al. |
| 2004/0227642 A1 | 11/2004 | Giles et al. |
| 2004/0236475 A1 | 11/2004 | Chowdhary |
| 2004/0236508 A1 | 11/2004 | Ogasawara |
| 2005/0021597 A1 | 1/2005 | Derasmo et al. |
| 2005/0033517 A1 | 2/2005 | Kondoh et al. |
| 2005/0125110 A1 | 6/2005 | Potter et al. |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama et al. |
| 2005/0193212 A1 | 9/2005 | Yuhara |
| 2005/0261816 A1 | 11/2005 | Dicroce et al. |
| 2006/0056663 A1 | 3/2006 | Call |
| 2006/0142917 A1 | 6/2006 | Goudy |
| 2006/0150197 A1 | 7/2006 | Werner |
| 2006/0156315 A1 | 7/2006 | Wood et al. |
| 2006/0220904 A1 | 10/2006 | Jarlengrip |
| 2006/0250224 A1 | 11/2006 | Steffel et al. |
| 2006/0293813 A1 | 12/2006 | Nou |
| 2007/0000702 A1* | 1/2007 | Yoshida .................. B60K 1/00 429/442 |
| 2007/0027595 A1 | 2/2007 | Nou |
| 2007/0050854 A1 | 3/2007 | Cooperstein et al. |
| 2007/0072616 A1 | 3/2007 | Irani |
| 2007/0100514 A1 | 5/2007 | Park |
| 2007/0103339 A1 | 5/2007 | Maxwell et al. |
| 2007/0200663 A1* | 8/2007 | White et al. .................. 340/5.31 |
| 2007/0255568 A1 | 11/2007 | Pennock |
| 2008/0070616 A1 | 3/2008 | Yun |
| 2008/0109653 A1 | 5/2008 | Yokohama |
| 2008/0148374 A1 | 6/2008 | Spaur et al. |
| 2008/0150683 A1 | 6/2008 | Mikan et al. |
| 2008/0275604 A1 | 11/2008 | Perry et al. |
| 2009/0030605 A1 | 1/2009 | Breed |
| 2009/0045928 A1 | 2/2009 | Rao et al. |
| 2009/0096596 A1 | 4/2009 | Sultan et al. |
| 2009/0120374 A1* | 5/2009 | Hansen ........................ 119/719 |
| 2009/0120699 A1* | 5/2009 | Suzuki ............... B60L 15/2045 180/65.265 |
| 2009/0167524 A1 | 7/2009 | Chesnutt et al. |
| 2009/0184800 A1 | 7/2009 | Harris |
| 2009/0195370 A1 | 8/2009 | Huffman et al. |
| 2009/0195376 A1* | 8/2009 | Miller et al. ................ 340/457.1 |
| 2009/0265059 A1* | 10/2009 | Medwin et al. .................. 701/33 |
| 2009/0275281 A1 | 11/2009 | Rosen |
| 2009/0309696 A1 | 12/2009 | Tsuruta et al. |
| 2009/0309709 A1 | 12/2009 | Bevacqua et al. |
| 2009/0326813 A1* | 12/2009 | Miller ........................... 701/208 |
| 2010/0004818 A1 | 1/2010 | Phelan |
| 2010/0007479 A1 | 1/2010 | Smith |
| 2010/0013596 A1 | 1/2010 | Kakiwaki |
| 2010/0030458 A1 | 2/2010 | Coughlin |
| 2010/0039224 A1 | 2/2010 | Okude et al. |
| 2010/0057586 A1 | 3/2010 | Chow |
| 2010/0075656 A1 | 3/2010 | Hawarter et al. |
| 2010/0097178 A1 | 4/2010 | Pisz et al. |
| 2010/0148923 A1 | 6/2010 | Takizawa |
| 2010/0178872 A1 | 7/2010 | Alrabady et al. |
| 2010/0191535 A1 | 7/2010 | Berry et al. |
| 2010/0191973 A1 | 7/2010 | Huntzicker et al. |
| 2010/0321203 A1 | 12/2010 | Tieman et al. |
| 2011/0009107 A1 | 1/2011 | Guba et al. |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0102146 A1 | 5/2011 | Giron |
| 2011/0105097 A1 | 5/2011 | Tadayon et al. |
| 2011/0106374 A1 | 5/2011 | Margol et al. |
| 2011/0112969 A1 | 5/2011 | Zaid et al. |
| 2011/0148574 A1 | 6/2011 | Simon et al. |

(56) References Cited

U.S. PATENT DOCUMENTS

| | | | |
|---|---|---|---|
| 2011/0166748 A1 | 7/2011 | Schneider et al. | |
| 2011/0213629 A1 | 9/2011 | Clark et al. | |
| 2011/0215921 A1 | 9/2011 | Ben Ayed et al. | |
| 2011/0275321 A1 | 11/2011 | Zhou et al. | |
| 2011/0295444 A1 | 12/2011 | Westra et al. | |
| 2012/0041633 A1 | 2/2012 | Schunder et al. | |
| 2012/0054036 A1 | 3/2012 | Nam et al. | |
| 2012/0065866 A1* | 3/2012 | Taylor | F02D 11/105 701/103 |
| 2012/0071140 A1 | 3/2012 | Oesterling et al. | |
| 2012/0139760 A1 | 6/2012 | Bevacqua et al. | |
| 2012/0157069 A1 | 6/2012 | Elliott et al. | |
| 2012/0209454 A1* | 8/2012 | Miller | B60R 25/20 701/2 |
| 2012/0280786 A1 | 11/2012 | Miller et al. | |
| 2012/0284702 A1 | 11/2012 | Ganapathy et al. | |
| 2012/0293317 A1 | 11/2012 | Hanna et al. | |
| 2012/0313768 A1 | 12/2012 | Campbell et al. | |
| 2012/0322617 A1* | 12/2012 | Takahashi | B60W 30/18036 477/96 |
| 2013/0005302 A1 | 1/2013 | Ozaki | |
| 2013/0143716 A1* | 6/2013 | Kodama | B60W 10/04 477/109 |
| 2013/0158767 A1* | 6/2013 | Araki | B60K 6/48 701/22 |
| 2013/0162421 A1 | 6/2013 | Inaguma et al. | |
| 2013/0200999 A1 | 8/2013 | Spodak et al. | |

FOREIGN PATENT DOCUMENTS

| | | |
|---|---|---|
| CN | 101421741 A | 4/2009 |
| CN | 101596895 A | 12/2009 |
| DE | 102007046270 A1 | 4/2009 |
| DE | 102011104061 A1 | 12/2012 |
| EP | 0449471 | 10/1991 |
| EP | 0971463 | 1/2000 |
| EP | 1095527 | 5/2001 |
| JP | 2008195253 | 8/2008 |
| JP | 2008303630 | 12/2008 |
| WO | 0125572 A1 | 4/2001 |
| WO | 2009158469 | 12/2009 |
| WO | 2012015403 | 2/2012 |

OTHER PUBLICATIONS

SALES@usasupremetech.com, In the U.S. a Car is Stolen Every 26 Seconds, The Wave of the Future, Biometrics Authentication, An Introduction.
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.
Chinese Office Action for corresponding Application No. 201210024996.0, mailed Jul. 15, 2015, 5 pages.
Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

* cited by examiner

SYSTEM AND METHOD FOR CONTROLLING A RESTRICTED MODE IN A VEHICLE

TECHNICAL FIELD

The embodiments described herein generally relate to a system and method for controlling a restricted mode in a vehicle.

BACKGROUND

It is known to provide a mechanism for enabling an authorized driver to enter a code into a vehicle to put the vehicle into a "valet mode". One example of this type of implementation is disclosed directly below.

U.S. Pat. No. 5,467,070 to Drori et al. provides a vehicle security system having a secure valet/programming switch. To either enter the system valet mode, or select a function via the valet/programming switch, the user must first enter a valid personal access code via the switch. To prevent an intruder from deciphering the personal code by trying various codes, the system ignores, after a preset number of successive invalid entries, further switch inputs for a preset period of time. When attempts to decipher the code are detected, the alarm is tripped, and the siren will sound. To accommodate various drivers of the same vehicle, more than one valid code can be stored in the system. Any of the personal access codes may be changed any time, but after the user's present code is entered.

SUMMARY

In one embodiment, a device for controlling a restricted mode of a vehicle is provided. The device includes a controller that is configured to receive an input indicative of a request to change a vehicle state from a fully operational mode to a restricted mode and to transmit a first control signal indicative of a request to limit at least one of vehicle speed and vehicle acceleration. The controller is further configured to monitor a distance traveled by a driver when the vehicle is in the restricted mode and to compare the distance traveled to a predetermined distance limit. The controller is further configured to transmit a second control signal to remove the request to limit the at least one of the vehicle speed and the vehicle acceleration in response to determining that the distance traveled exceeds the predetermined distance limit.

In another embodiment, a device for controlling a restricted mode of a vehicle is provided. The device comprises a controller. The controller is configured to receive a signal indicative of at least one portable auxiliary memory device being operably coupled to the vehicle when the vehicle is in a fully operational mode and to receive an input indicative of a request to change a vehicle state from the fully operational mode to a restricted mode. The controller is further configured to monitor whether the at least one auxiliary memory device is no longer operably coupled to the vehicle when the vehicle is in the restricted mode and to notify a driver that the at least one auxiliary memory device is no longer operably coupled to the vehicle.

In another embodiment, an apparatus comprising a controller is provided. The controller is configured to receive an input indicative of a request to change a vehicle state from a fully operational mode to a restricted mode and to monitor for a signal indicative of an occupant communication device belonging to a driver being operably coupled to the vehicle when the vehicle is in the restricted mode. The controller is further configured to change the vehicle state from the restricted mode to the fully operational mode in response to receiving the signal.

DETAILED DESCRIPTION

The embodiments set forth herein generally illustrate and describe a plurality of controllers (or modules), or other such electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle. The controllers may be combined with each other and/or separated in any manner based on the particular type of electrical architecture that is desired in the vehicle. It is generally recognized that each controller and/or module/device disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

Figure 1:
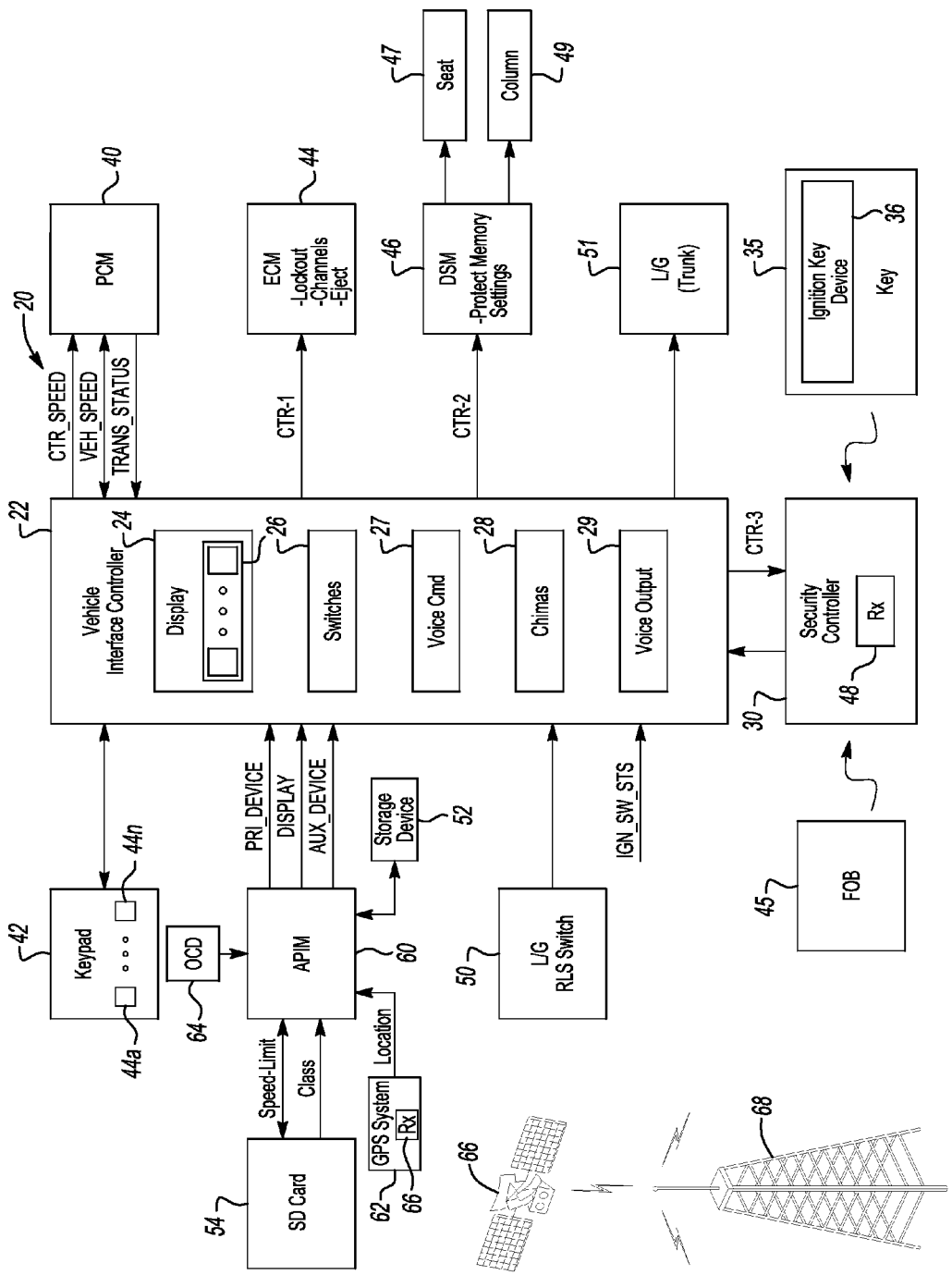
FIG. 1 depict a system for controlling a restricted mode in accordance to one embodiment of the present invention.
Figure 2A:
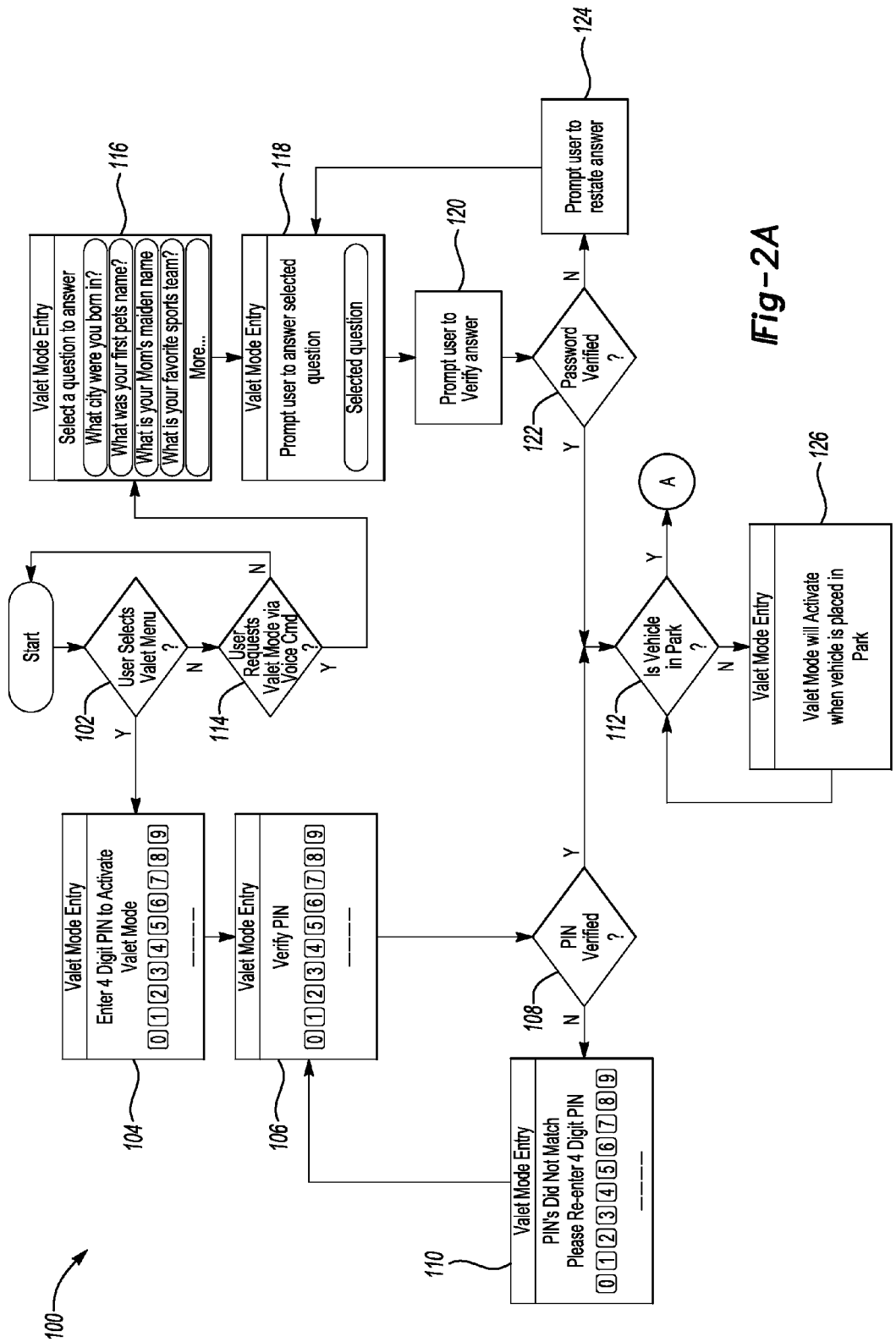
FIGS. 2a-2d depict a method for controlling a restricted mode in accordance to one embodiment of the present invention.
Figure 2B:
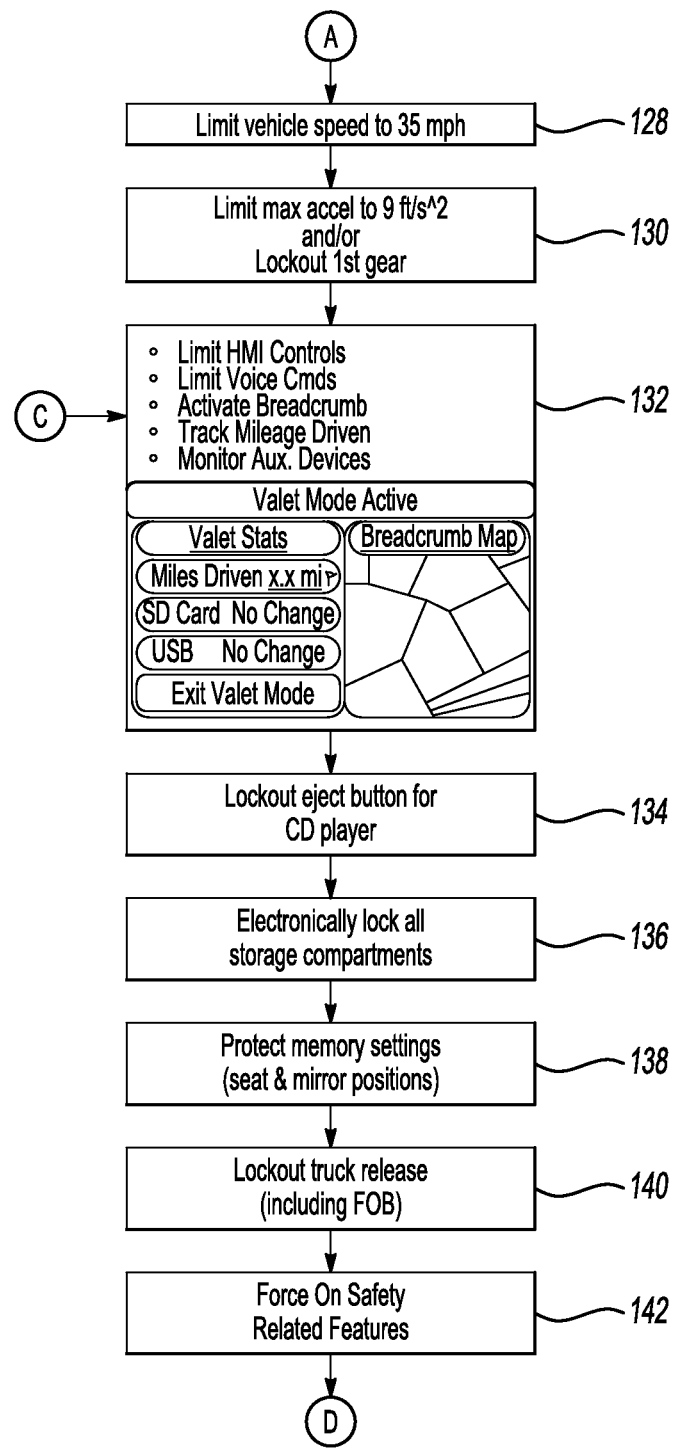
Figure 2C:
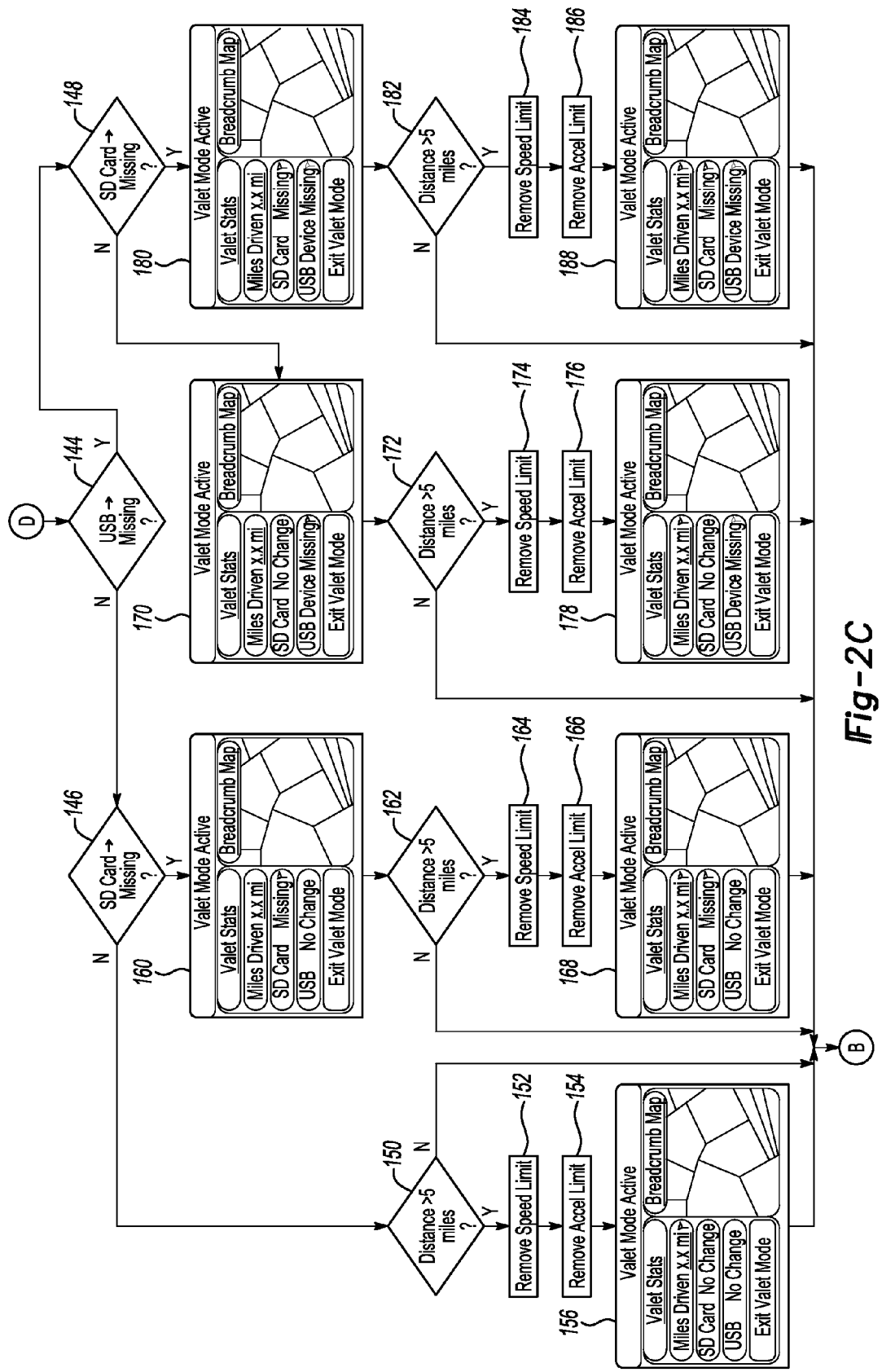
Figure 2D:
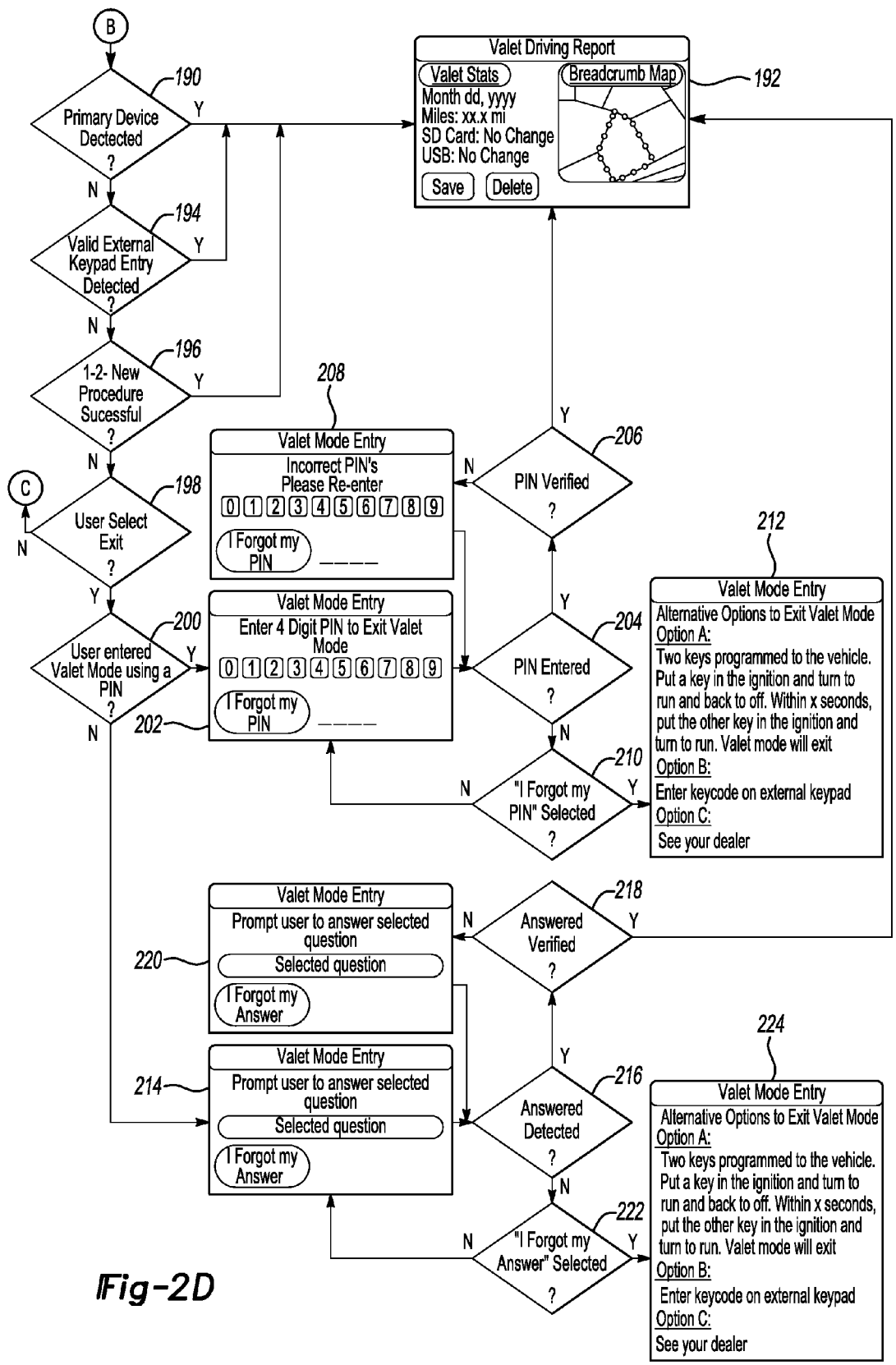

FIG. 1 depicts a system 20 for executing a restricted mode in accordance to one embodiment of the present invention. The system 20 generally comprises a vehicle interface device (or controller) 22. The controller 22 includes a display 24 that provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message.

The controller 22 also includes a plurality of switches 26, a voice recognition command interface 27, chimes 28, and voice output capability 29. The driver may toggle the switches 26 to view different messages and/or select various options. The voice recognition command interface 27 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 28 may audibly notify the driver when predetermined vehicle conditions have been met. In one example, the controller 22 may activate the chimes 28 when the vehicle is near a top speed, the vehicle has achieved a top speed, the vehicle has exceeded the top speed, there is a low level of fuel in the fuel tank, and/or when the traction control is enabled. In one example, the voice output capability 29 enables the controller 22 to transmit audio signals to the driver in the manner, but not limited to, that described in the '440 publication. In one example, the switches 26 may be positioned within the display 24 such that the display 24 and the switches function as a touch screen. The switches 26 may be implemented as alpha-numeric characters. The significance of the switches 26 will be discussed in more detail below. While the display 24, the switches 26, the voice input command interface 27, chimes 28, and the voice output capability 29 are shown within the controller 22, it is contemplated that one or more of these mechanisms may be positioned exterior to the controller 22.

A security controller 30 is operably coupled to the controller 22. While FIG. 1 generally illustrates that the security controller 30 is positioned outside of the controller 22, other implementations may include the security controller 30 being implemented directly within the controller 22. In general, one or more of the signals transmitted to/from the controller 22 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 35. The controller 22 may receive a signal IGN_SW_STS from a body controller (not shown) to determine the position of the ignition switch. The key 35 includes an ignition key device 36 embedded therein for communicating with the vehicle. The ignition key device 36 may be in the form of a transponder that includes an integrated circuit and an antenna. The transponder is adapted to transmit an electronic code wirelessly to the security controller 30. The security controller 30 compares the electronic codes to predetermined data to ensure that the key is authorized to start an engine of the vehicle. The security controller 30 transmits a first authorization signal to the controller 22 via the data communication bus. A powertrain control module (PCM) 40 is operably coupled to the controller 22. The controller 22 transmits a second authorization signal to the PCM 40. The PCM 40 enables an engine to start in response to the second authorization signal. The PCM 40 is configured to provide a signal VEH_SPEED over the data communication bus to the controller 22. The signal VEH_SPEED corresponds to the speed of the vehicle. The controller 22 may transmit a signal CTR_SPD to the PCM 40. The signal CTR_SPD may correspond to a command to instruct the PCM 40 to limit a top speed of the vehicle and/or vehicle acceleration. The PCM 40 may transmit a signal TRANS_STATUS to the controller 22. The signal TRANS_STATUS may correspond to transmission status (e.g., park, reverse, neutral, drive, low (automatic transmission)).

A keypad 42 is operably coupled to the controller 22 (or to the security controller 30). The keypad 42 may be positioned on an exterior of the vehicle. The keypad 42 includes a plurality of switches 44a and 44n. The switches 44a-44n may be in the form of letters, numbers, or any combination thereof (e.g., alpha-numeric). A user may use the keypad 42 to gain entry into the vehicle. For example, the user may enter a predetermined code via the switches 44a-44n. The code may be transmitted electronically either hardwire, by the data communication bus, or wirelessly to the controller 22. The controller 22 receives the code from the keypad 22 and compares to an authorized code. If the received code matches the authorized code, then the controller 22 may control one or more lock mechanisms (not shown) that are positioned about vehicle doors to unlock the door.

The controller 22 may also use data received from the switches 44a-44n of the keypad 42 and/or from the switches 26 of the controller 22 to determine whether an authorized driver has put the vehicle in a restricted mode. The restricted mode generally corresponds to a vehicle state in which one or more vehicle controllers in the vehicle restrict the level of functionality provided for a particular driver. A driver may enter a predetermined code via the switches 44a-44n of the keypad and/or from the switches 26 of the controller 22 to place the vehicle in the restricted mode in moments in which it is desired to limit vehicle functionality for a particular driver.

It is recognized that the predetermined code that is entered via the switches 26 may correspond to a personalized code that is established by the primary driver (via the controller 22) and that the predetermined code entered via the switches 44a-44n may be a factory code that is used to unlock the vehicle (in a similar manner the factory code may be changed by the primary driver to a personalized code for entry into the keypad 42 to unlock the vehicle—this may be accomplished by programming sequence via the keypad 42). The predetermined code as referenced hereafter may correspond to the personalized code (entered either through the switch 26 or switches 44a-44n) or the factory code (entered through the switches 44a-44n).

In one example, it may be desirable to limit vehicle functionality when a valet, technician/mechanic or employee is given temporary possession of the vehicle for performing a specific task. The valet, technician/mechanic, or employee may be defined as a secondary driver. It is recognized that other drivers who may not have complete control, ownership of the vehicle, and/or some form of diminished authority, may also be recognized as a secondary driver. A primary driver is generally defined as a driver who has full control over vehicle functionality by means of ownership or other entitlement.

While entry of the predetermined code via the switches (e.g., via the controller 22 or the keypad 42) may place the vehicle in the restricted mode, additional inputs may be used as a precondition to place the vehicle in the restricted mode. For example, the controller 22 may further require that the vehicle is in park either before or after receiving the proper code via the switches 76 or 44a-44n. The controller 22 receives the signal TRANS_STATUS to monitor whether the vehicle is in park when the code is entered via the switches. The additional step of ensuring that the vehicle is in park may assist in minimizing driver distraction and may allow the PCM 40 to modify its calibration to limit speed and/or acceleration. For example, when the vehicle is placed in the restricted mode, the controller 22 transmits the signal CTR_SPD to the PCM 40 such that the PCM 40 controls a top speed or acceleration of the vehicle. In one example, the PCM 40 may limit the top speed of the vehicle to 35 mph and/or the acceleration to 9 ft./s2. The requirement of placing the vehicle in park as a precondition to place the vehicle in the restricted mode is optional.

Additional features may be controlled when the vehicle is in the restricted mode. An entertainment control module (ECM) 44 is operably coupled to the controller 22 via the bus. The ECM 44 is generally configured to transmit audio and/or video signals for one or more occupants in the vehicle for entertainment purposes. In the restricted mode, the controller 22 transmits a signal CTR_1 to the ECM 44. The ECM 44 determines whether the vehicle is in the restricted mode based on the signal CTR_1. In response to the ECM 44 receiving the signal CTR_1 indicating that the vehicle is in the restricted mode, the ECM 44 may disable the function of transmitting audio and/or video signal or the ECM 44 may prevent the secondary driver from overriding or changing pre-stored channels as established by the primary driver. The ECM 44 may also prevent the secondary driver from ejecting any discs (e.g. CDs, DVDs, etc.) that are housed therein when the vehicle is in the restricted mode.

A driver seat module 46 (DSM) is operably coupled to the controller 22 via the bus. The DSM 46 is generally configured to control the movement of a seat 47 in the vehicle such that the seat 47 is moved to a desired position for the driver. The DSM 46 is also generally configured to provide for a memory seat function. For example, the primary driver may store one or more seat positions via switches (not shown) such that the seat 47 is moved to at least one preset position as established by the primary driver. In the restricted mode, the controller 22 transmits a signal CTR_2 to the DSM 46. The DSM 46 determines whether the vehicle is in the restricted mode based on the signal CTR_2. In response to the DSM 46 receiving the signal CTR_2 indicating that the vehicle is in the restricted mode, the DSM 46 may prevent the secondary driver from overriding or changing the pre-stored seat positions as established by the primary driver. The DSM 46 may also control the position of a steering column and/or exterior mirrors 49. In a similar fashion to that described directly above, in the event the vehicle is detected to be in the restricted mode, the DSM 46 may not allow the secondary driver to erase or override stored positions of the steering column and/or exterior mirrors 49.

The security controller 30 includes a receiver 48 for receiving wireless signals from a keyfob 45 or other suitable device. The security controller 30 may unlock/lock one or more doors (not shown) of the vehicle and/or open the liftgate (or trunk) 51 of the vehicle in response to the wireless signals transmitted by the fob 45. While the vehicle is in the restricted mode, the security controller 30 may not allow the liftgate 51 to open in the event the secondary driver attempts to use the fob to open the liftgate 51 of the vehicle. Conversely, a liftgate release switch 50 may be operably coupled to the controller 22. The controller 22 may be situated to open the liftgate 51 in response to the liftgate release switch 50 being depressed. The controller 22 may ignore requests from the liftgate release switch to open the liftgate 51 when the vehicle is in the restricted mode. Such a feature may prevent the secondary driver from gaining access to the liftgate area (or trunk) where personal property belonging to the primary driver may be stored.

The vehicle may restrict the operation of additional features than those noted above while the vehicle is in the restricted mode. For example, the controller 22 may limit or altogether disable the voice command 27 and/or voice output 29 features, track distance of the vehicle while the vehicle is driven by the secondary driver, monitor various auxiliary devices (will be described in more detail below), and/or force on various safety related features. Examples of safety related features that may be forced on include, but not limited to, traction control, park aid, forward collision warning, seat belt minder feature, lane departure warning. Examples of these systems are described in co-pending U.S. Ser. No. 12/966,520, filed on Dec. 13, 2010, which is hereby incorporated by reference in its entirety.

The controller 22 is generally configured to exit from the restricted mode when the primary driver inputs the pre-selected code again via the switches 26 and/or 44a-44n or any other operation as described in connection with FIGS. 2a-2d. Upon exiting the restricted mode, the controller 22 may generate a usage report that provides information related to the distance, speed, etc. of the secondary driver while the vehicle was in the restricted mode. The vehicle may automatically exit from the restricted mode when the controller 22 detects that the vehicle has been driven by the secondary driver for over a predetermined distance limit. In one example, the predetermined distance limit may correspond to 5 miles. In this case, when the primary driver regains access to the vehicle and notices that the vehicle has a speed or acceleration limitation in place, the primary driver will have notice that the secondary driver had driven the vehicle over the predetermined distance limit. The other restrictions will remain in place so long as the vehicle is in the restricted mode. The motivation to remove the speed/acceleration limitation while in the restricted mode may benefit the primary driver. For example, the primary driver may regain control of the vehicle and may have forgotten the code to move the vehicle out of the restricted mode. In this case, the primary driver may be able to drive the vehicle without speed and/or acceleration restrictions (i.e., limp home mode) to get the vehicle to a desired location (e.g., residence of primary driver). At this point, the primary driver may place a first programmed key in the ignition and turn to "RUN" and back to "OFF". Within X seconds, the primary driver may place a second programmed key in the ignition and turn to "RUN" and back to "OFF". The vehicle will exit from the restricted mode if two programmed keys are inserted and toggled from "RUN" to "OFF". The above-described process is generally defined as "ONE-TWO New Procedure".

The controller 22 visually and/or audibly communicates to the primary driver that the vehicle was driven over the predetermined distance limit when the vehicle exits out of the restricted mode. In this implementation, the restricted mode may remain intact even when the vehicle is driven over the predetermined distance limit.

An auxiliary protocol interface module (APIM) (or communication module) 60 is operably coupled to the controller 22. The APIM 60 is configured to receive an occupant communication device (OCD) 62. The APIM 60 is generally part of an in-vehicle communication system which interfaces with the OCD 62 to enable voice input control to perform a function with the OCD 62 so that the driver does not have to enter data directly into the OCD 62. The APIM 60 may interface via switches (not shown) positioned within the vehicle to enable touch selection control to perform a function with the OCD 62 so that the driver does not have to enter data directly into the OCD 62. The OCD 62 is wirelessly coupled to the APIM 60. In one example, the APIM 60 may be implemented as part of the SYNC system developed by Ford Motor Company® and Microsoft®. The OCD 62 may include any number of communication devices that use a wireless protocol. For example, one such wireless protocol may include Bluetooth™. The OCD 62 may use any protocol that is generally situated to facilitate wireless communication. Switches may be positioned on the APIM 60, the vehicle's steering wheel (not shown), the ECM 44, or on the controller 22 to enable touch input.

As noted above, in the restricted mode, the controller 22 and/or the APIM 60 may monitor auxiliary devices. Examples of auxiliary devices include a storage device 52 (e.g., USB storage device), a secure digital (SD) card 54, or Media Player (MP3) (not shown). In one example, the SD card 54 may be a memory map device that includes topographical maps that are used in connection with a global positioning system (GPS) 64.

Detection of the OCD 62 may be used as a mechanism to cause the vehicle to exit the restricted mode. For example, when the OCD 62 belonging to the primary driver is detected to be operably coupled to the APIM 60 when the vehicle is in the restricted mode, the APIM 60 may transmit a signal PRI_DEVICE to the controller 22 to alert the controller 22 that the primary driver is in the vehicle. The controller 22 may exit the valet mode in response to the signal PRI_DEVICE indicating that the OCD 62 belonging to the primary driver is detected. The APIM 60 is generally configured to associate the first OCD 62 that is programmed thereto as belonging to the owner of the vehicle (or the primary driver). In addition, the primary driver may selectively program any OCD 60 as a primary device. As such, when the APIM 60 detects that the primary device is in the vehicle while the vehicle is in the restricted mode, the controller 22 may automatically exit from the restricted mode.

The global positioning satellite (GPS) system 64 includes a receiver and is operably coupled to the APIM 60 via the data communication bus. The GPS system 64 enables the driver of the vehicle to locate a particular destination by providing the driver with driving directions to reach the particular destination. The GPS system 64 is configured to provide a signal LOCATION to the APIM 60. The signal LOCATION corresponds to coordinate data that is used to identify the location of the vehicle. The GPS system 64 may use the coordinate data that is used to identify the location of the vehicle to, among other things, obtain driving directions to reach a particular destination. The data on the signal LOCATION may comprise latitude and longitudinal information corresponding to the various locations of the vehicle while driven by the primary driver or the secondary driver. In general, a plurality of satellites 66 and/or a plurality of ground stations 68 communicate with the GPS system 64 to establish the location of the vehicle. For example, the GPS system 64 is capable of establishing the vehicle's position and velocity relative to the earth's surface processing data received from the plurality of satellites 66 and/or the ground stations 68.

As the vehicle moves latitudinally and/or longitudinally across the earth's surface, the GPS system 64 is capable of presenting the position of the vehicle with reference coordinates that correspond to, among other things, the latitude and longitude on the earth's surface. It is generally known that the implementation of a GPS system 64 on a vehicle is capable of providing the position of the vehicle via latitude and longitude coordinates relative to the earth's surface.

As noted above, the memory map device 54 includes, but not limited to, topographical maps stored therein may be received by the APIM 60 so that a pictorial map of the location in which the vehicle is positioned in real time can be provided over a signal DISPLAY to the controller 22. The memory map device 54 also includes posted speed limits for a particular road that is being driven on by the driver or functional class information for a particular road that is being driven on that is also capable of being sent from the APIM 60 to the controller 22. The memory map device 54 is known to include pictorial map data, posted speed limits, and/or functional class information that can be provided to the driver. The APIM 60 may merge the stored latitude and longitude data, the pictorial map data, the posted speed limits, and/or the functional class information provided by the memory map device 54 so that a visual display can be presented over the signal DISPLAY to the controller 22. The storage controller 22 may be implemented as a USB compatible memory stick and be used by the driver to upload various vehicle preferences into the vehicle, such as preset radio stations, memory seat positions, temperature control data, personalized pictures for presentation on display 24, etc.

The storage device 52 and the memory map device 54 are portable devices that may be generally accessible to one or more vehicle occupants. In the event the vehicle is driven by the secondary driver, it may be noteworthy to notify the primary driver that such devices were removed when the vehicle was driven by the secondary driver. The APIM 60 monitors whether the storage device 52 and/or the SD card 54 are operably coupled thereto. In the event the APIM 60 determines that the storage device 52 and/or the SD card 54 (or other auxiliary device) are removed, the APIM 60 transmits a signal AUX_DEVICE to the controller 22. The controller 22 generates an alert that the storage device 52 and/or the SD card 54 are removed.

FIGS. 2a-2d depict a method 100 for entering into the restricted mode and for performing various vehicle operations when the vehicle is in the restricted mode in accordance to one embodiment of the present invention. The particular order of the operations in the method 100 when performed can be in any order and are not to be limited to only being performed sequentially. The order of the operations may be modified and vary based on the desired criteria of a particular implementation.

In operation 102, the primary driver may select a restricted mode menu in the controller 22. The menu may be displayed on the display 24 and the selections may occur via switches 26a-26n. If the primary driver has selected the restricted mode menu, then the method 100 moves to operation 104. If the primary driver has not selected the restricted mode menu, then the method 100 moves to operation 114.

In operation 104, the primary driver may enter the predetermined code into the controller 22 via the switches 26a-26n in the controller 22.

In operation 106, the primary driver may reenter the predetermined code into the controller 22 via the switches 26a-26n to verify the code.

In operation, 108, the controller 22 determines whether the proper predetermined code has been entered. If the proper predetermined code has not been entered, then the method 100 moves to operation 110. If the proper predetermined code has been entered, then the method 100 moves to operation 112.

In operation 110, the controller 22 may notify the driver that the proper predetermined code has not been entered, or did not match and request that the primary driver enter the predetermined code again.

In operation 112, the controller 22 may determine whether the vehicle is in park. For example, the controller 22 may monitor the signal TRANS_STATUS to assess the transmission status. It is recognized that the controller 22 may command the primary driver to place the vehicle in park after receiving the predetermined code. If the vehicle is not in park, then the method 100 moves to operation 126. If the vehicle is in park, then the method moves to operation 128.

In operation 114, (the method 100 moves to operation 114 if it is determined that the user did not select the restricted mode) the primary driver may request to enter into the restricted mode via voice command 27. If the user did not request to enter into the restricted mode via the voice command 27, then the method 100 moves back to start. If the user did request to enter into the restricted mode via the voice command 27, then the method 100 moves to operation 116.

In operation 116, the controller 22 prompts the primary driver to select a question to answer to authenticate the primary driver.

In operation 118, the controller 22 provides the question selected by the primary driver for the corresponding answer. The answer in this case serves as the password.

In operation 120, the controller 22 prompts the primary driver to verify the answer by asking the primary driver to provide the answer (or password) again.

In operation 122, the controller 22 verifies the password. If the controller 22 fails to verify the password, then the method 100 moves to operation 124. If the device verifies the password, then the method 100 moves to operation 112.

In operation 124, the controller 22 prompts the primary driver to enter the answer again.

In operation 126, the controller 22 has failed to detect the vehicle is in park. The method 100 then moves back to operation 112.

In operation 128, the controller 22 commands the PCM 40 to limit the speed of the vehicle to a predetermined speed. As noted above, one example of a predetermined speed may be 35 mph. By limiting the speed, the temptation for the valet driver to take the vehicle from the premises in which the primary driver is located may be reduced. The predetermined speed may correspond to a vehicle speed that is suitable to enable a valet driver to park the vehicle.

In operation 130, the controller 22 commands the PCM 40 to limit a max acceleration speed and/or lock the vehicle out of 1st gear. By limiting acceleration, aggressive driving may be limited such as spinning tires, etc.

In operation 132, the controller 22 may (i) limit various human machine interfaces, (ii) limit its capability to response to voice input(s), (iii) limit its capability to audibly prompt the secondary driver, (iv) activate a breadcrumb trail via the GPS system 64 (e.g., vehicle will monitor where the vehicle has been driven while in the restricted mode and visually display trail on display 24), (v) track the distance driven, and (vi) monitor the status of various auxiliary devices such as, but not limited to, the storage device 52 and the SD card 54 has been removed from the vehicle. An example describing the manner in which a controller may activate a breadcrumb trail via the GPS system 64 when the SD card 54 is removed is set forth in co-pending U.S. Patent Publication No. 2009/0326813, filed on Jun. 26, 2009 which is hereby incorporated by reference.

The controller 22 may include a restricted mode display menu for depicting miles driven, places visited, and the status of the storage device 52 and the SD card 54.

In operation 134, the controller 22 may command the ECM 44 to lock out the disc eject feature and to lock all preset stations.

In operation 136, the controller 22 may control locking mechanism associated with various storage compartments (e.g., glove box, center console storage, etc.) to remain in a locked state when the vehicle is in the restricted mode.

In operation 138, the controller 22 may control the DSM 46 to protect all pre-stored locations for the steering column, seats 47, or mirrors 49.

In operation 140, the controller 22 locks out the liftgate release feature (including the liftgate release switch on the fob).

In operation 142, the controller 22 forces on all safety related features.

In operation 144, the controller 22 determines whether the storage device 52 is missing (or has been removed). If the storage device 52 is not missing, the method 100 moves to operation 146. If the storage device 52 is missing, then the method 100 moves to operation 148.

In operation 146, the controller 22 determines whether the SD card 54 is missing (or has been removed). If the SD card 54 is not missing, then the method 100 moves to operation 150. If the SD card 54 is missing, then the method 100 moves to operation 160.

In operation 150, the controller 22 determines whether the vehicle has been driven over the predetermined distance limit. If the vehicle was not driven past the predetermined distance limit, then the method 100 moves to operation 190. If the vehicle has been driven past the predetermined distance limit, then the method 100 moves to operation 152.

In operation 152, the controller 22 controls the PCM 40 to remove the vehicle speed restriction.

In operation 154, the controller 22 controls the PCM 40 to remove the vehicle acceleration restriction.

In operation 156, the controller 22 notifies the primary driver that the vehicle has been driven over the predetermined distance limit. This condition alerts the primary driver that the vehicle has been driven over a distance that was not believed to be necessary for the secondary driver to perform the task desired by the primary driver.

In operation 160, the controller 22 notifies the primary driver that the SD card 54 is missing.

In operation 162, the controller 22 determines whether the vehicle has been driven over the predetermined distance limit. If the vehicle was not driven past the predetermined distance limit, then the method 100 moves to operation 190. If the vehicle has been driven past the predetermined distance limit, then the method 100 moves to operation 164.

In operation 164, the controller 22 controls the PCM 40 to remove the vehicle speed restriction.

In operation 166, the controller 22 controls the PCM 40 to remove the vehicle acceleration restriction.

In operation 168, the controller 22 notifies the primary driver that the vehicle has been driven over the predetermined distance limit and that the SD card 54 was removed. This condition alerts the primary driver that the vehicle has been driven over a distance that was not believed to be necessary for the secondary driver to perform the task desired by the primary driver and that the secondary driver has taken the SD card 54.

In operation 170, the controller 22 notifies the primary driver that the storage device 52 is missing.

In operation 172, the controller 22 determines whether the vehicle has been driven over the predetermined distance limit. If the vehicle was not driven past the predetermined distance limit, then the method 100 moves to operation 190. If the vehicle has been driven past the predetermined distance limit, then the method 100 moves to operation 174.

In operation 174, the controller 22 controls the PCM 40 to remove the vehicle speed restriction.

In operation 176, the controller 22 controls the PCM 40 to remove the vehicle acceleration restriction.

In operation 178, the controller 22 notifies the primary driver that the vehicle has been driven over the predetermined distance limit and that the storage device 52 has been removed. This condition alerts the primary driver that the vehicle has been driven over a distance that was not believed to be necessary for the secondary driver to perform the task desired by the primary driver and that the secondary driver has taken the storage device 52.

In operation 180, the controller 22 notifies the primary driver that the storage device 52 and the SD card 54 are missing.

In operation 182, the controller 22 determines whether the vehicle has been driven over the predetermined distance limit. If the vehicle was not driven past the predetermined distance limit, then the method 100 moves to operation 190. If the vehicle has been driven past the predetermined distance limit, then the method 100 moves to operation 184.

In operation 184, the controller 22 controls the PCM 40 to remove the vehicle speed restriction.

In operation 186, the controller 22 controls the PCM 40 to remove the vehicle acceleration restriction.

In operation 188, the controller 22 notifies the primary driver that the vehicle has been driven over the predetermined distance limit and that both the storage device 52 and the SD card 54 have been removed. This condition alerts the primary driver that the vehicle has been driven over a distance that was not believed to be necessary for the secondary driver to perform the task desired by the primary driver and that the secondary driver has taken the storage device 52 and the SD card 54.

In operation 190, the controller 22 determines whether the primary device (such as the owner's phone) has been detected. If the primary device has been detected, then the method 100 moves to operation 192. If the primary device has not been detected, then the method 100 moves to operation 194.

In operation 194, the controller 22 determines whether the predetermined code was entered via the switches 44a-44n of the keypad 42. If the proper code was entered, then the method 100 moves to operation 192. If not, then the method 100 moves to operation 196.

In operation 196, the controller 22 determines whether the primary driver has inserted two already programmed keys as noted in connection with the One-Two New Procedure as described above. If the primary driver has successfully performed the One-Two New Procedure, then the method 100 moves to operation 192. If not, then the method 100 moves to operation 198. The vehicle will exit the restricted mode in the event the primary driver performs the One-Two New Procedure. By successfully performing the One-Two New Procedure, this indicates that the driver has possession of two or more valid keys to the vehicle.

In operation 192, the controller 22 provides a restricted mode report, which depicts various activities (as noted above) that occurred while the vehicle was driven by the secondary driver. The controller 22 generates the report in response to determining that the operations noted in operations 190, 194, and 196 are found to be true.

In operation 198, the controller 22 determines whether the primary driver has selected the "exit valet mode" prompt as shown in 156, 168, 178, and 188. If so, the method 100 moves to operation 200. If not, the method 100 moves back to operation 132.

In operations 200, 202 and 204, the controller 22 determines whether the driver has entered the predetermined code via the switches 26 thereon so that the primary driver is capable of accessing a restricted mode prompt on the controller 22 itself for the purpose of disabling the restricted mode. If the driver has entered the predetermined code, then the method 100 moves to operation 202. If this condition is not true, then the method 100 moves to operation 214.

In operation 202, the controller 22 prompts the primary driver to enter the predetermined code via the switches 26.

In operation 204, the controller 22 determines whether the predetermined code was entered. If the predetermined code has been entered, then the method 100 moves to operation 206. If not, then the method 100 moves to operation 210.

In operation 206, the controller 22 determines predetermined code is a valid PIN. If valid, the method 100 moves to operation 192 and generates the restricted mode report. If not valid, the method moves to operation 208.

In operation 208, the controller 22 prompts the primary driver to re-enter the predetermined code again.

In operation 210, the controller 22 determines whether the primary driver selected the option on the display 24 in which a valid PIN is forgotten by the primary driver. If the valid PIN was forgotten, then the method 100 moves to operation 212.

In operation 212, the controller 22 waits to determine if the primary driver is successful in performing the One Two New Procedure or enters a valid code via the switches 44a-44n to exit out of the restricted mode.

In operation 214, the primary driver may control the controller 22 via the switches 22 to provide a question prompt to enable the primary driver to exit from the restricted mode.

In operation 216, the controller 22 determines whether an answer was received in response to the question via touch entry or voice input command. If the answer is detected, then the method 100 moves to operation 218. If not, then the method 100 moves to operation 222.

In operation 218, the controller 22 determines whether the answer is correct. If the answer is correct, then the method 100 moves to operation 192 to generate the restricted mode report. If the answer is not correct, then the method 100 moves to operation 220.

In operation 220, the controller 22 prompts the primary driver again to re-answer the question.

In operation 222, the controller 22 determines whether the primary driver selected the option on the display 24 in which the answer is forgotten by the primary driver. If the answer was forgotten, then the method 100 moves to operation 224.

In operation 224, the controller 22 waits to determine if the primary driver is successful in programming a second key or enters a valid code via the switches 44a-44n to exit out of the restricted mode.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention. As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A device for controlling a restricted mode of a vehicle, the device comprising:
   a controller being configured to:
   receive an input indicative of a request to change a vehicle state from a fully operational mode to a restricted mode;
   transmit a first control signal indicative of a request to limit at least one of vehicle speed and vehicle acceleration;

monitor a distance traveled by a driver when the vehicle is in the restricted mode;

compare the distance traveled to a predetermined distance limit; and transmit a second control signal to remove the request to limit the at least one of the vehicle speed and the vehicle acceleration in response to determining that the distance traveled exceeds the predetermined distance limit.

2. The device of claim 1 wherein the controller is further configured to monitor whether at least one portable auxiliary memory device is operably coupled to the vehicle while the vehicle is in the restricted mode.

3. The device of claim 2 wherein the controller is further configured to notify a primary driver that the at least one portable auxiliary memory device is no longer operably coupled to the vehicle while the vehicle was in the restricted mode.

4. The device of claim 3 wherein the at least one auxiliary memory device comprises one of a universal serial bus (USB) based memory device card and a secure digital (SD) card.

5. The device of claim 1 wherein the controller is further configured to monitor a distance traveled by a secondary driver and to audibly or visually notify a primary driver of the distance traveled by the secondary driver.

6. The device of claim 1 wherein the controller is further configured to receive a first input indicative of a predetermined code to exit the restricted mode from at least one of a keypad that controls locking/unlocking of the vehicle, a switch positioned interior to the vehicle, and a voice entry interface for changing the vehicle state from the restricted mode to the fully operational mode.

7. The device of claim 1 wherein the controller is further configured to determine if a primary driver has successfully performed a one-two new programming procedure for changing the vehicle state from the restricted mode to the fully operational mode.

8. The device of claim 7 wherein the one-two new programming procedure includes cycling at least two already programmed keys to the vehicle in an ignition of the vehicle from "RUN" to "OFF" within a predetermined time frame.

* * * * *